Dec. 1, 1931.  M. H. SHIPLEY  1,834,537
ATTACHABLE HANDLE FOR STEERING WHEELS
Filed Feb. 16, 1929
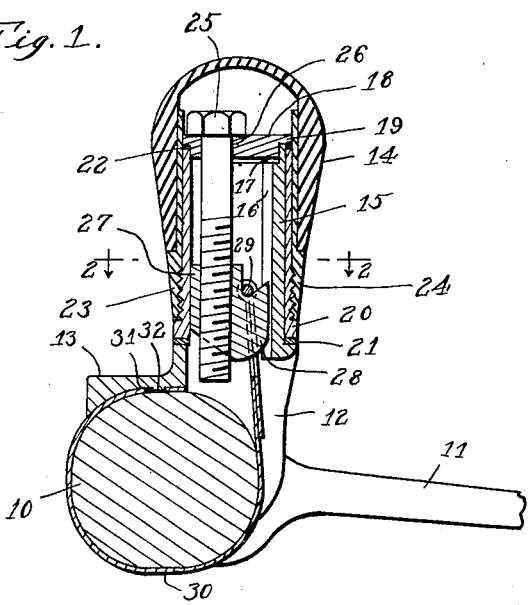
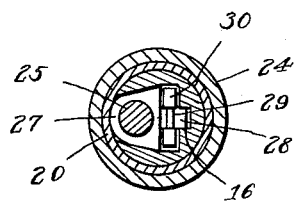
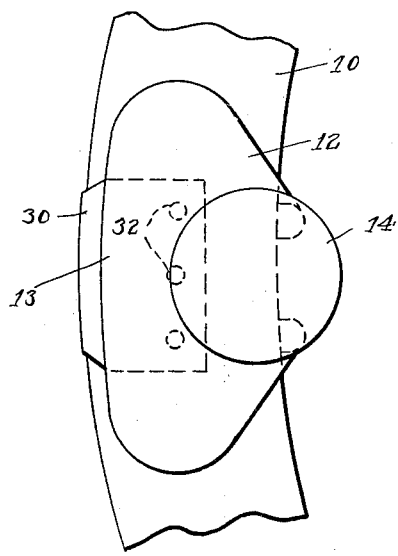
Inventor:
Manly H. Shipley
By Wilson & McCanna
Attys.

Patented Dec. 1, 1931

1,834,537

UNITED STATES PATENT OFFICE

MANLY H. SHIPLEY, OF ROCKFORD, ILLINOIS

ATTACHABLE HANDLE FOR STEERING WHEELS

Application filed February 16, 1929. Serial No. 340,483.

This invention relates to an attachable handle for automobile steering wheels, designed to facilitate the turning of the wheel and also minimize fatigue in the holding of the wheel in driving.

Various forms of handles or knobs have been proposed for attachment to steering wheels but it appears that none of these has proved practical. They were evidently awkward and unhandy to use, presented a poor appearance, such that owners of the better class of cars would not care to adopt them, and were not easy to attach or remove, or adjust the position thereof. Some of these handles were, moreover, bound to get loose in time, which, of course, made them unsatisfactory, and the application of many of them necessitated marring of the steering wheel, which, of course, was objectionable particularly if they were ever to be removed. However, one of the principal drawbacks to these other handles, it appears, was that no one size would fit all sizes and shapes of steering wheels. Another important drawback was that none of them made proper provision for the resting of the hands.

It is, therefore, the principal object of my invention to provide handles for the purpose referred to which are quickly attachable and detachable, or adjustable in position, which fit all sizes and shapes of steering wheels with equal facility and which, when properly fastened in place, positively will not get loose. These handles are, moreover, designed to afford ample hand rests on the bases thereof and, as will presently appear, not only present a pleasing appearance but have a simple, thoroughly practical, and sturdy construction.

The handle of my invention is illustrated in the accompanying drawings wherein—

Figure 1 is a central vertical section therethrough showing the same applied to the rim of a steering wheel;

Fig. 2 is a horizontal section on the line 2—2 of Fig. 1, and

Fig. 3 is a top view of Fig. 1.

The same reference numerals are applied to corresponding parts throughout the views.

The handle shown is the left hand one of a pair, it being preferable to use two handles, either in diametrically opposed relation on the rim of the steering wheel, or nearly so, depending on the preference of the driver, although, of course, some might prefer to have only one handle disposed in a mid position. The rim 10 of the steering wheel appears in section and a portion of one spoke 11 appears in elevation in Fig. 1. The handle comprises a base 12 suitably cast to fit over the top and on the inside of the rim of the wheel as shown, the top portion 13 being elongated, as best appears in Fig. 3, and flattened on top to provide an ample hand rest about the base of the knob or grip 14 of the handle. Thus, the driver does not have to keep a tense grip on the knob 14, which would be tiring, but while holding the knob can rest the side of his hand on the broad, flat hand rest. A rest of this kind is found to be quite a luxury, particularly on a long, steady drive. This handle, therefore, in avoiding the necessity for the driver having to hold his wrists in an unnatural position, is not objectionable as are most, if not all, of the devices of a similar kind provided in the past in making it a tedious and tiresome proposition by necessitating a constant close grip thereon.

The base 12 has a hollow post 15 preferably cast integral therewith. The latter has a smooth cylindrical exterior but the bore thereof has the non-cylindrical form, as appears in Fig. 2, providing a vertically extending guideway 16 on the inside of the post for a purpose which will soon appear. The upper end of the post is counter-bored, as represented at 17, to receive the reduced cylindrical portion of a cap 18. The annular flange 19 of said cap projects about the upper end of the post to retain a sleeve 20, together with washers 21 and 22, of leather or other equivalent material. The sleeve 20 is externally threaded, as shown at 23, and is arranged to have the internally threaded end of the sleeve insert 24 of the knob 14 make threaded connection therewith. The knob 14 is preferably made of bakelite or other molded material with the metallic sleeve insert cemented or molded therein. A bolt 25 entered through an eccentric hole 26 in the cap 18 threads in a draw nut 27 slidably received inside the post 15. A longitudinal flange 28 formed on the nut 27 enters the guideway 16. The upper end of this flange is cut away to form a hook for reception of a cross-pin 29 mounted in the bifurcated and looped end of a flexible steel band 30. The loop on the end of the band is rendered extremely strong, suitably by welding the end thereof in place. The band has a plurality of holes 31 provided in the other end thereof through which a like number of nibs 32, suitably cast integral with the base 12, are arranged to be entered and the ends thereof riveted to permanently secure the band 30 to the base 12.

In the application of the handle of my invention to the rim of a steering wheel, the base 12 is placed in approximately the desired position on the rim 10 and the band 30 is passed around the rim and hooked onto the flange 28 of the draw nut 27, which is then slipped up into the lower end of the bore of the post 15. Then the sleeve 20 and washers 21 and 22 are assembled on the post 15 following which the cap 18 is placed on the upper end thereof. The bolt 25 is then inserted through the hole 26 and threaded into the nut 27 and tightened with a wrench or pliers until the band 30 is drawn up tight enough to make the post absolutely rigid. After that, the knob 14 can be slipped over the outside of the sleeve 20 and threaded in place to complete the assembly. Obviously, the knob 14 is fairly free to turn. The washers 21 and 22 are arranged to be slightly compressed in the assembling of the handle so that there will be no end play which might possibly mean rattling. It will be evident that it is simply a matter of providing the band 30 of the proper length to make the handle fit any sized steering wheel. There is enough movement of the draw nut 27 allowed for inside the post 15 for a considerable range of sizes and if, perchance, an extremely small cross-section has to be fitted I contemplate using a filler block inserted between the rim and the band. That, however, will not be found necessary except only in extreme cases. Obviously, the band 30 when drawn up will conform itself to the shape of the wheel and when the bolt 25 is drawn tight there is absolutely no chance of the handle working loose. This type of handle also has the advantage that if the driver, after fastening the same in one position, finds that he would rather have the same moved to another position he can do so without exposing a marred spot on the wheel; the attachment of the handle positively will not mar the wheel. This fact is, of course, of considerable importance from the standpoint that a car owner, when selling or exchanging his car, will usually want to remove the handles to attach them to the steering wheel of his new car, and if the removal of the handles meant exposing mars on the steering wheel rim that, of course, could not very well be done.

In operation, the driver takes hold of the knobs 14 in a free and easy manner, the hands being allowed to rest somewhat on the hand rests 13. There is, therefore, absolutely nothing which might, in any way, cause fatigue even on a long steady drive; the hands are in a perfectly natural position and the muscles are not tensed the least bit. In making a turn there is none of that noticeable awkwardness occasioned by having to shift the position of both hands several times; the driver simply swings the wheel by means of either knob, using it somewhat like a crank handle. Where the wheel is swung through more than a complete turn the driver simply shifts the knob he is moving from one hand to the other. The fact that the knob can be operated like a crank handle is of particular advantage in parking or backing the car, where the wheel frequently has to be turned back and forth repeatedly to maneuver the car into the exact position desired.

It is believed the foregoing description conveys a clear understanding of my invention. The appended claims have been drawn with a view to covering not only the specific construction herein illustrated and described, but also such variations as anyone skilled in the art might devise especially after this disclosure.

I claim:

1. An attachable handle for a steering wheel or the like comprising a base arranged to be set on the rim or other part of the wheel, a post projecting from said base, a flexible element fastened at one end to the base and passed around the rim for the purpose of fastening the base thereto, means adjustable lengthwise of the post and having connection with the other end of said flexible element whereby to place the later under tension to clamp the base to the rim, and a knob fitting over the post and concealing said means.

2. An attachable handle for a steering wheel or the like comprising a base arranged to be set on the rim of the wheel, said base having a hollow post rising therefrom, a flexible band fastened at one end to the base and passed around the rim for the purpose of fastening the base thereto, means in the post and adjustable endwise of the latter having connection with the other end of the band and arranged to place the same under tension to clamp the base to the rim, and a knob mounted on the post.

3. An attachable handle for a steering wheel or the like comprising a base arranged to be set on the rim of the wheel, said base having a hollow post rising therefrom, a flexible band fastened at one end to the base and passed around the rim for the purpose of fastening the base thereto, a draw nut slidably received in the post and having connection with the other end of said band, a bolt cooperating with the nut in such a way that it is arranged when tightened to move the nut and place the band under tension so as to clamp the base to the rim, and a knob fitting over the post.

4. An attachable handle for a steering wheel or the like comprising a base arranged to be set on the rim of the wheel, said base having a hollow post rising therefrom, a flexible band fastened at one end to the base and passed around the rim for the purpose of fastening the base thereto, a sleeve fitting over the post and free to turn thereon, a cap fitting on top of the post serving to hold the sleeve in place, a bolt passed through a hole provided in said cap and extending inside the post, a draw nut having said bolt threading therein and having connection with the other end of said band whereby in the tightening of said bolt the band is placed under tension to clamp the base to the rim, and a knob fitting over the aforesaid sleeve and detachably secured thereto.

5. A structure as set forth in claim 4 wherein the bolt hole in said cap is eccentric relative to the cap and post whereby to dispose the bolt at one side of the bore of said post, and wherein said nut has a projection on the other side thereof having connection with the end of said band.

6. A structure as set forth in claim 4 including a washer of leather or equivalent material fitting over the post and having engagement with one end of said sleeve, said washer being arranged in the tightening of said bolt to be placed under slight compression and serving thereby to hold the sleeve against end play while permitting the turning thereof.

7. A structure as set forth in claim 4 including a pair of washers of leather or equivalent material fitting over the post and engaged by the opposite ends of said sleeve, said washers being arranged in the tightening of said bolt to be slightly compressed to hold the sleeve against end play while permitting the turning thereof.

8. An attachable handle for a steering wheel comprising a base arranged to fit over the top and inside of the rim of a steering wheel, a hollow post projecting therefrom, a flexible band fastened at one end to the base on the inner side of the top portion thereof and arranged to be passed around the outside of the rim and under the same and up over the inside of said rim into said post, a draw nut slidably but non-rotatably received in said post having a quickly attachable connection with the free end of said band, a bolt or screw mounted in said post so as to be held against endwise movement at least in one direction and threading in said nut, the same being arranged to be tightened whereby to move said nut and place the band under tension to clamp the base to the rim, and a knob mounted on said post.

9. A structure as set forth in claim 8 including a sleeve rotatably mounted on the post but held against endwise movement relative thereto, said sleeve having the knob arranged to slip over the same and be fastened thereto whereby to permit turning of the knob relative to the post.

10. A structure as set forth in claim 8 wherein the draw nut has a vertically extending flange provided thereon, said flange being conformed to provide a hook, and wherein the end of said band is bifurcated to receive said flange and formed with a loop on the end thereof having a cross-pin mounted therein to fit on the hook.

11. An attachable handle for a steering wheel comprising a base arranged to fit over the top and inside of the rim of a steering wheel, a hollow post projecting therefrom, a flexible band fastened at one end to the base on the inner side of the top portion thereof and arranged to be passed around the outside of the rim and under the same and up over the inside of said rim into said post, a draw nut slidably received in said post having a vertical flange arranged to have a quickly attachable connection with the free end of said band, a bolt or screw mounted in said post so as to be held against endwise movement at least in one direction and threading in said nut, the same being arranged to be tightened whereby to move said nut and place the band under tension to clamp the base to the rim, and a knob mounted on said post, the said post having a vertically extending guideway wherein the edge of said flange is slidably received.

12. A structure as set forth in claim 8 wherein the base has a plurality of nibs formed integral therewith, the end of the band arranged to be attached to said base having holes provided therein for the entry therethrough of said nibs, the ends of the nibs being upset to permanently secure the band to the base without the use of rivets or other means of fastening.

13. A device of the character described, comprising a base arranged to be set on the rim or other part of a steering wheel and formed so as to engage the same on two adjacent sides, a flexible element permanently fastened at one end to the base and extending around the rest of the rim not covered by the base, said element when placed under tension being adapted to conform itself to the cross-section of the rim so as to get a good hold thereon, means carried by the base and having detachable connection with the other end of said flexible element for placing the same under tension to clamp the base to the rim, and a knob carried on the base.

14. An attachable handle for a steering wheel or the like comprising a base arranged to be set on the rim or other part of the wheel, said base having a hollow post rising therefrom, a flexible band fastened at one end to the base and passed around the rim for the purpose of fastening the base thereto, means in the post and operable from the upper end thereof having connection with the free end of the band to place the same under tension to clamp the base to the rim, a sleeve swiveled on the post and held against removal therefrom by endwise movement relative thereto, and a knob fitting over the post and down over the sleeve, the sleeve having an externally threaded portion, and the knob having an internally threaded portion for threaded engagement with the externally threaded portion of the sleeve, the knob when applied to the sleeve serving to conceal the means in the post and prevent access to the upper end of the post for operation of said means.

15. An attachable handle for a steering wheel or the like comprising a base arranged to be set on the rim or other part of the wheel, said base having a hollow post rising therefrom, a flexible band fastened at one end to the base and passed around the rim for the purpose of fastening the base thereto, means in the post and operable from the upper end thereof having connection with the free end of the band to place the same under tension to clamp the base to the rim, and a knob fitting over the post serving to conceal said means and prevent access to the upper end of said post for operation of said means, said knob being suitably held against removal from the post.

16. A device of the character described comprising a base arranged to be attached to the rim or other part of a steering wheel on the top thereof, the base having the top thereof formed to provide an elongated substantially flat hand rest for substantially the full length of the fleshy part of the side of the driver's hand, and a knob having a ball-shaped enlarged upper end and a reduced lower end, said knob rising from the base from one side of the hand rest portion at a point approximately midway of the ends of the latter so that the person resting the side of his hand on the hand rest has the ball-shaped enlarged upper end of the knob fitting in the hollow of the palm of his hand for ease in holding said knob and operating the same.

17. A device of the character described comprising a base portion arranged to be set on the rim or other part of a steering wheel, a handle portion projecting from the base portion, a flexible element fastened at one end to the base portion and arranged to be passed around the rim or other part of the wheel and extended to the handle portion, and means connected with the latter end of said element and arranged to adjust the same lengthwise of the handle portion to place the same under tension and clamp the base portion to the wheel.

18. A handle for attachment to a steering wheel or the like, comprising a base having a horizontal portion arranged to fit on the top of the rim or other part of the wheel and a vertical portion to fit on the adjacent side of the rim or other part of the wheel, the latter portion being bifurcated, a hollow post projecting upwardly from the base over the bifurcated portion thereof, a flexible element attached at one end to the horizontal portion of the base and arranged to be passed around the rim or other part of the wheel and through the bifurcated portion into the hollow post, and means in said post for placing the element under tension whereby to clamp the base to the wheel, the said post constituting part of a handle by means of which the wheel is arranged to be operated.

19. A handle for attachment to a steering wheel or the like, comprising a base arranged to be set on the rim or other part of the wheel and having a post projecting therefrom, a flexible element fastened at one end to the base and arranged to be passsed around the rim for the purpose of fastening the base thereto, the free end of said element being arranged to be extended to the post, and means on the post for placing the element under tension whereby to clamp the base to the wheel, the said post constituting part of a handle by means of which the wheel is arranged to be operated.

In witness of the foregoing I affix my signature.

MANLY H. SHIPLEY.